(12) United States Patent
Chen et al.

(10) Patent No.: US 9,107,191 B2
(45) Date of Patent: Aug. 11, 2015

(54) SYSTEM AND METHOD FOR MANAGING SIMULTANEOUS UPLINK SIGNAL TRANSMISSIONS IN CARRIER AGGREGATION SYSTEMS

(71) Applicant: Qualcomm Incorporated, San Diego, CA (US)

(72) Inventors: Wanshi Chen, San Diego, CA (US); Juan Montojo, Nuremberg (DE); Peter Gaal, San Diego, CA (US); Jelena Damnjanovic, Del Mar, CA (US); Tao Luo, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 194 days.

(21) Appl. No.: 13/673,834

(22) Filed: Nov. 9, 2012

(65) Prior Publication Data

US 2013/0121271 A1  May 16, 2013

Related U.S. Application Data

(60) Provisional application No. 61/558,863, filed on Nov. 11, 2011.

(51) Int. Cl.
*H04W 80/04* (2009.01)
*H04W 88/06* (2009.01)
(Continued)

(52) U.S. Cl.
CPC ............. *H04W 72/02* (2013.01); *H04L 1/0026* (2013.01); *H04L 1/1861* (2013.01); *H04L 5/001* (2013.01); *H04L 5/0055* (2013.01); *H04L 5/0057* (2013.01); *H04W 72/0473* (2013.01); *H04L 1/1671* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

2010/0098012 A1  4/2010  Bala et al.
2011/0103247 A1*  5/2011  Chen et al. .................... 370/252
(Continued)

FOREIGN PATENT DOCUMENTS

WO  2011118943 A2  9/2011

OTHER PUBLICATIONS

Alcatel-Lucent et al: "Simultaneous Uplink Transmissions and Uplink Transmission Combinations with Carrier Aggregation", 3GPP DRAFT; R1-110220 UL Transmission CA Final, 3RD Generation Partnership Project (3GPP), Mobile Competence Centre ; 650, Route Des Lucioles ; f-06921 Sophia-Antipolis Cedex ; France, vol. RAN WG1, No. Dublin, Ireland; 20110117, Jan. 14, 2011, XP050490396, [retrieved on Jan. 14, 2011].

(Continued)

*Primary Examiner* — Ronald B Abelson
(74) *Attorney, Agent, or Firm* — Norton Rose Fulbright US LLP

(57) ABSTRACT

Systems and methods for managing the transmission of multiple signals on one or more uplink (UL) channels using carrier aggregation in LTE-A systems. A UE simultaneously transmits signals such as ACK/NACK and periodic CSI using one or more uplink channels, such as a physical uplink shared channel (PUSCH) and/or a physical uplink control channel (PUCCH), by increasing the resources used to transmit at least one of those signals. According to one aspect, a UE simultaneously transmits ACK/NACK signals and periodic CSI signals by multiplexing those signals on the PUSCH. Certain aspects avoid frequently dropped periodic CSI signals and provide mechanisms to ensure that ACK/NACK signals are transmitted.

64 Claims, 14 Drawing Sheets

(51) Int. Cl.
*H04W 28/04* (2009.01)
*H04W 72/04* (2009.01)
*H04W 72/02* (2009.01)
*H04L 1/18* (2006.01)
*H04L 5/00* (2006.01)
*H04L 1/00* (2006.01)
*H04L 1/16* (2006.01)

(56) References Cited

U.S. PATENT DOCUMENTS

| | | | |
|---|---|---|---|
| 2011/0235743 A1* | 9/2011 | Lee et al. | 375/295 |
| 2011/0249578 A1 | 10/2011 | Nayeb Nazar et al. | |
| 2011/0269490 A1 | 11/2011 | Earnshaw et al. | |
| 2012/0113832 A1 | 5/2012 | Montojo et al. | |
| 2012/0127950 A1 | 5/2012 | Chung et al. | |
| 2012/0207109 A1 | 8/2012 | Pajukoski et al. | |
| 2013/0016687 A1 | 1/2013 | Yang et al. | |

OTHER PUBLICATIONS

International Search Report and Written Opinion—PCT/US2012/064565—ISA/EPO—Feb. 4, 2013.

Samsung, "Concurrent transmission of Scheduling Request indicator and ACK/NACK information for LTE-Advanced", 3GPP TSG Ran WG1 #61 R1-103004, Montreal, Canada, May 2010, 7pgs.

* cited by examiner

SYSTEM AND METHOD FOR MANAGING SIMULTANEOUS UPLINK SIGNAL TRANSMISSIONS IN CARRIER AGGREGATION SYSTEMS

RELATED APPLICATIONS

The present application for patent claims priority to Provisional Application No. 61/558,863, entitled "SYSTEM AND METHOD FOR MANAGING SIMULTANEOUS UPLINK SIGNAL TRANSMISSIONS IN CARRIER AGGREGATION SYSTEMS" filed Nov. 11, 2011, and assigned to the assignee hereof and hereby expressly incorporated by reference herein for all purposes.

BACKGROUND

1. Field

Aspects of the present disclosure relate generally to wireless communication systems, and more particularly to invalid reference subframes in channel state information feedback in a carrier aggregation system.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Systems and methods for managing the transmission of multiple signals on one or more uplink (UL) channels using carrier aggregation in LTE-A systems. A UE simultaneously transmits signals such as ACK/NACK and periodic CSI using one or more uplink channels, e.g., a physical uplink shared channel (PUSCH) and/or a physical uplink control channel (PUCCH), by increasing the resources used to transmit at least one of those signals. According to one aspect, a UE simultaneously transmits ACK/NACK signals and periodic CSI signals by multiplexing those signals on the PUSCH. Certain aspects avoid frequently dropped periodic CSI signals and provide mechanisms to ensure that ACK/NACK signals are transmitted.

The ACK/NACK signals may be multiplexed with the periodic CSI signals on the PUSCH to reduce the number of dropped periodic CSI signals. Additional features provide further improvement in simultaneously transmitting ACK/NACK signals and periodic CSI signals. Such additional features include: 1) joint coding of ACK/NACK and periodic CSI; 2) allocating additional resources (e.g., symbols, RBs, etc.) to be punctured (or rate matched) by the ACK/NACK according to certain conditions; 3) transmitting ACK/NACK and periodic CSI signals with increased transmit power according to certain conditions, and 4) transmitting ACK/NACK and periodic CSI signals in parallel on the PUSCH and the PUCCH where system configurations allow.

Representative aspects of the present disclosure may be directed to a method for managing wireless communications between a base station and a UE, where the method includes determining, at the UE, resources used to transmit an ACK/NACK signal in a channel, wherein the channel carries at least one other signal to the base station, identifying, at the UE, a reason to modify the resources, modifying the resources according to the identified reason in response to the identifying, and transmitting, from the UE, the ACK/NACK signal with the modified resources and at least one other signal in the channel to the base station.

Further representative aspects of the present disclosure may be directed to an apparatus configured for managing wireless communications between a base station and a UE, where the apparatus includes means for determining, at the UE, resources used to transmit an ACK/NACK signal in a channel, wherein the channel carries at least one other signal to the base station, means for identifying, at the UE, a reason to modify the resources, means, executable in response to said identifying, for modifying the resources according to the identified reason, and means for transmitting, from the UE, the ACK/NACK signal with the modified resources and at least one other signal in the channel to the base station.

Further representative aspects of the present disclosure may be directed to a UE that includes at least one processor and a memory coupled to the processor. The processor is configured to determine, at the UE, resources used to transmit an ACK/NACK signal in a channel, wherein the channel carries at least one other signal to the base station, identify, at the UE, a reason to modify the resources, modify the resources according to the identified reason in response to said identifying, and transmit, from the UE, the ACK/NACK signal with the modified resources and at least one other signal in the channel to the base station.

Further representative aspects of the present disclosure may be directed to a non-transitory computer-readable storage medium that includes code for causing a computer to determine, at the user equipment, resources used to transmit an ACK/NACK signal in a channel, wherein the channel carries at least one other signal to the base station, identify, at the user equipment, a reason to modify the resources, modify the resources according to the identified reason in response to said identifying, and transmit, from the user equipment, the ACK/NACK signal with the modified resources and at least one other signal in the channel to the base station.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
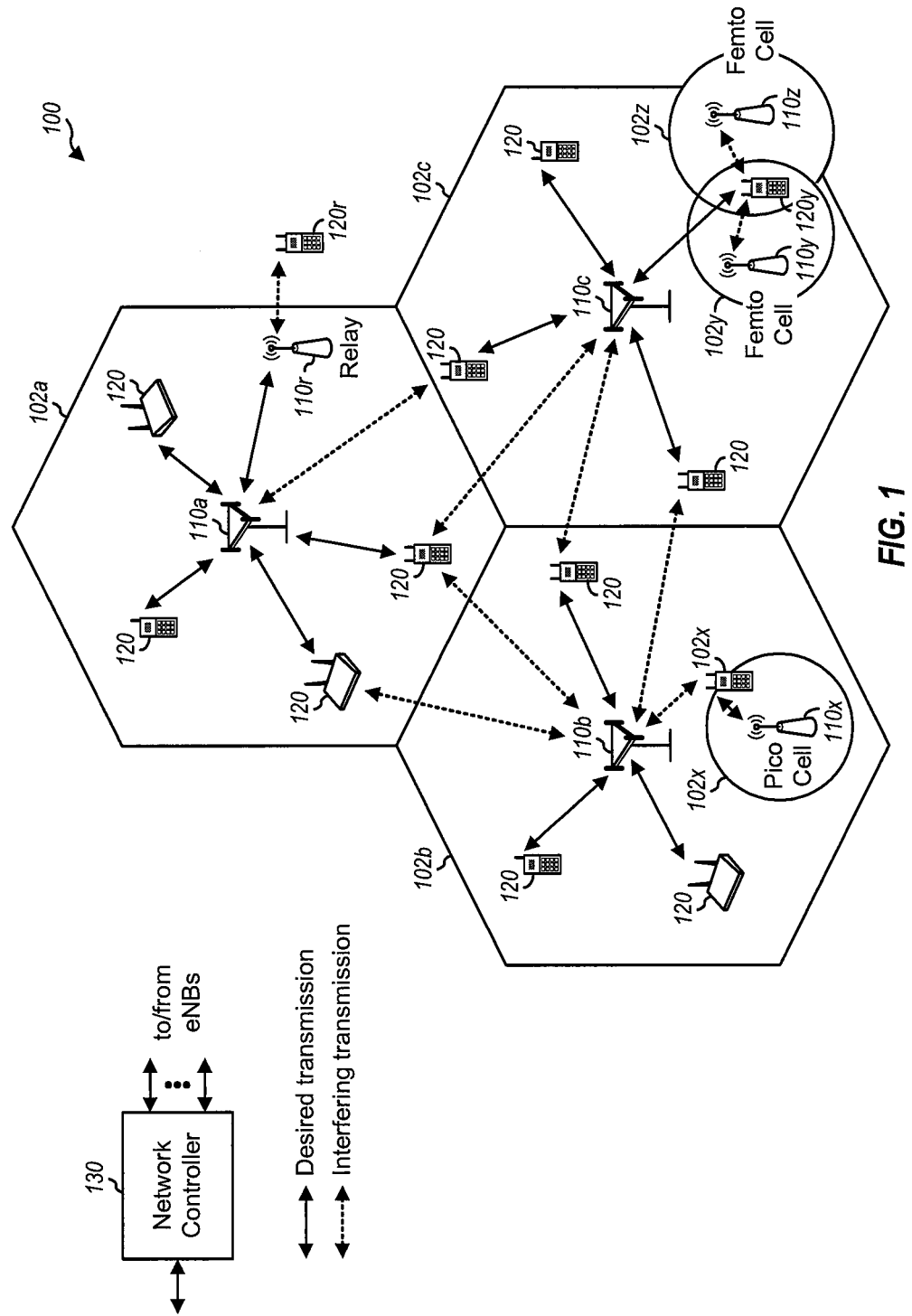
FIG. 1 is a block diagram conceptually illustrating an example of a telecommunications system in a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (e.g., 6 resource blocks), and there may be 1, 2, 3, 8 or 16 sub-bands for a corresponding system bandwidth of 1.25, 2.5, 5, 10, 15 or 20 MHz, respectively.

Figure 2:
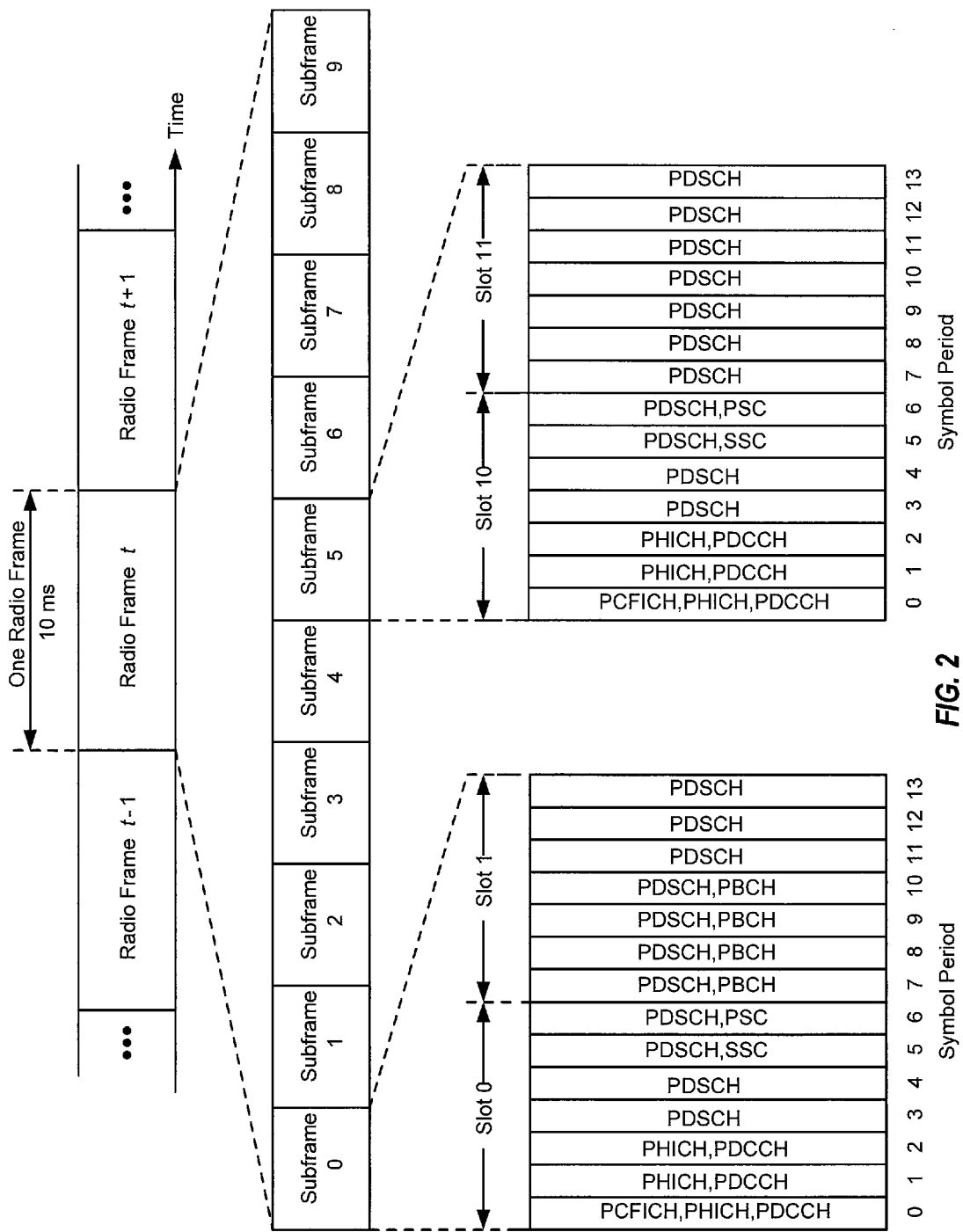
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 3 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
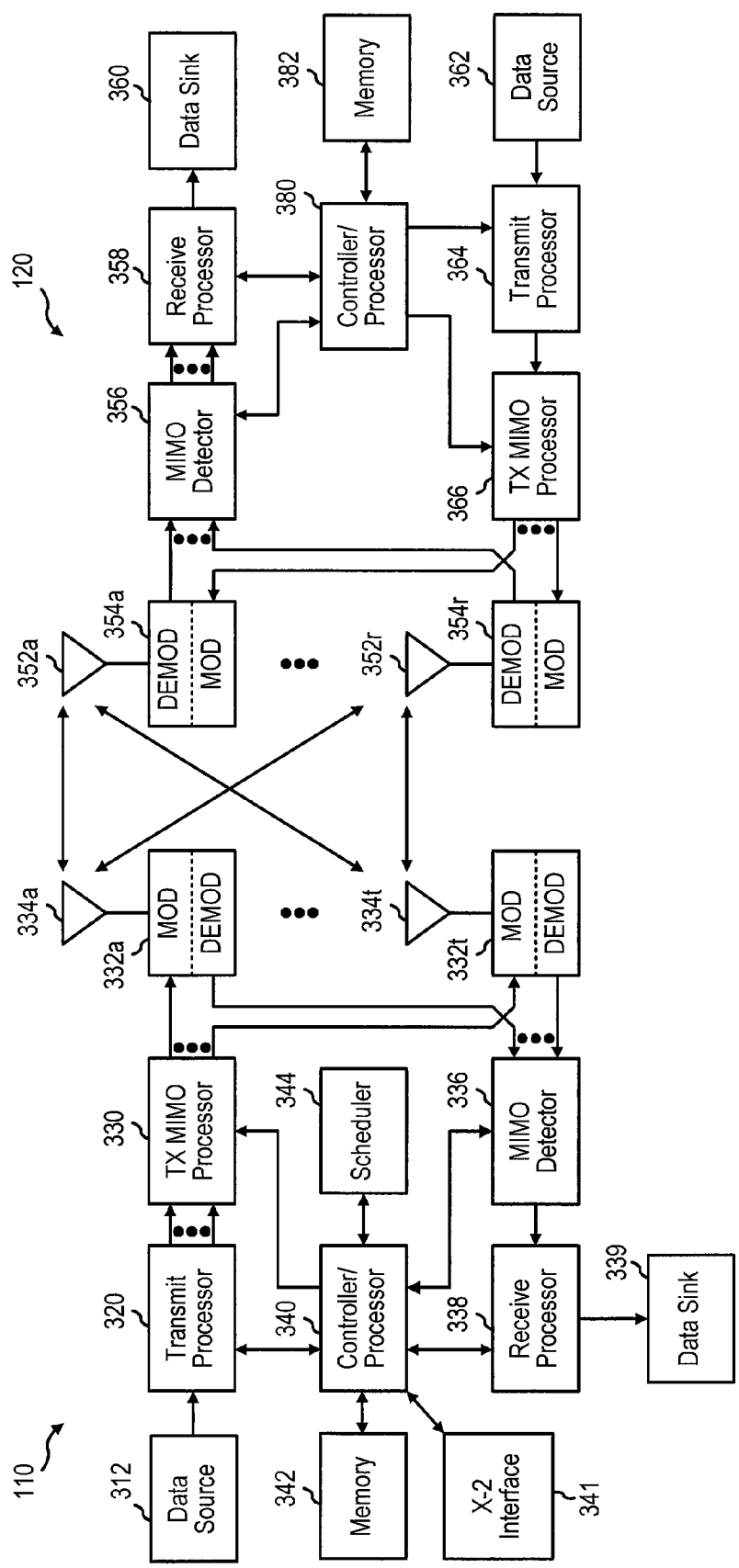
FIG. 3 is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. The base station 110 may be the macro eNodeB 110*c* in FIG. 1, and the UE 120 may be the UE 120*y*. The base station 110 may also be a base station of some other type. The base station 110 may be equipped with antennas 334*a* through 334*t*, and the UE 120 may be equipped with antennas 352*a* through 352*r*.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332*a* through 332*t*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332*a* through 332*t* may be transmitted via the antennas 334*a* through 334*t*, respectively.

At the UE 120, the antennas 352*a* through 352*r* may receive the downlink signals from the base station 110 and may provide received signals to the demodulators (DEMODs) 354*a* through 354*r*, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354*a* through 354*r*, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354*a* through 354*r* (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340. The base station 110 can send messages to other base stations, for example, over an X2 interface 341.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in use FIG. 7, and/or other processes for the techniques described herein. The memories 342 and 382 may store data and program codes for the base station 110 and the UE 120, respectively. A scheduler 344 may schedule UEs for data transmission on the downlink and/or uplink.

Carrier Aggregation

LTE-A UEs use spectrum in up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
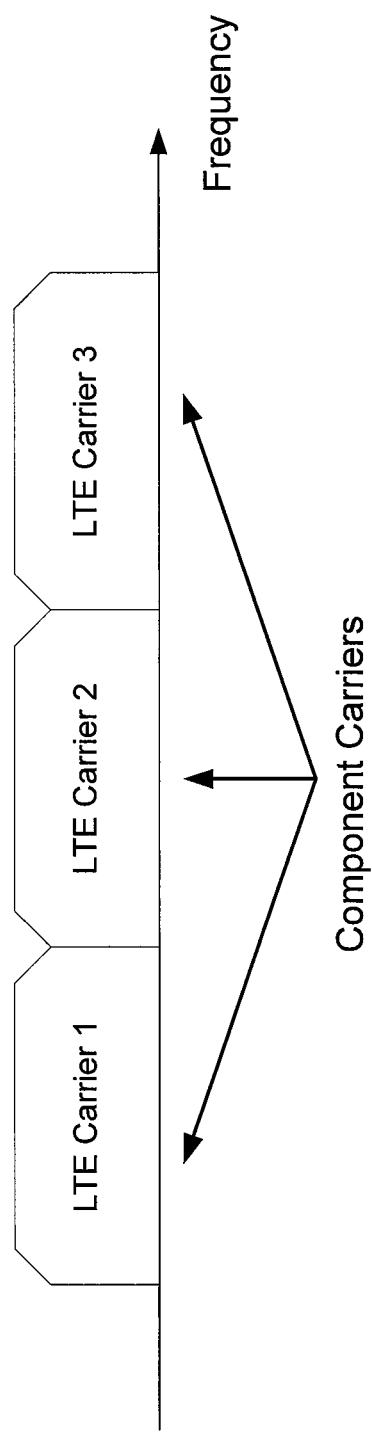
FIG. 4A discloses a continuous carrier aggregation type.
Figure 4B:
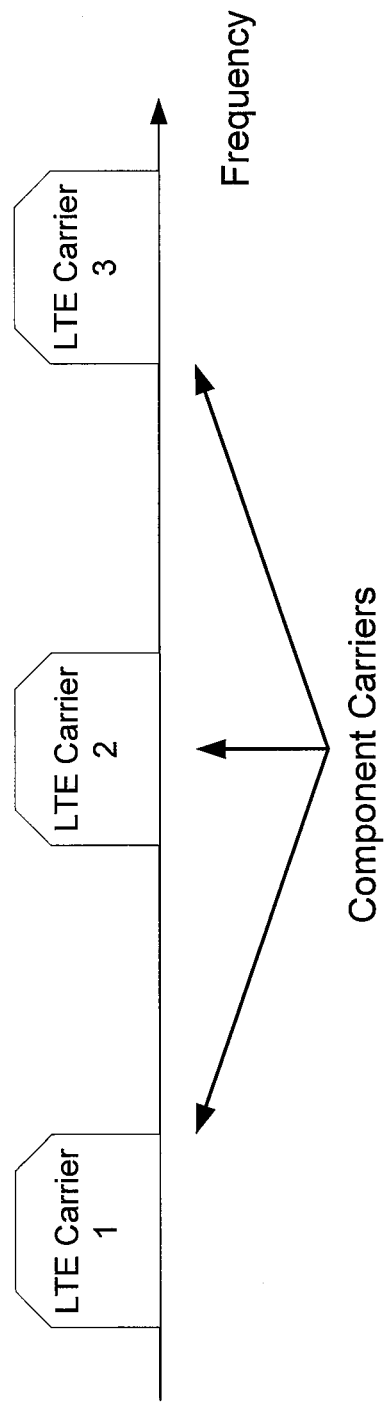
FIG. 4B discloses a non-continuous carrier aggregation type.

For the LTE-A mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
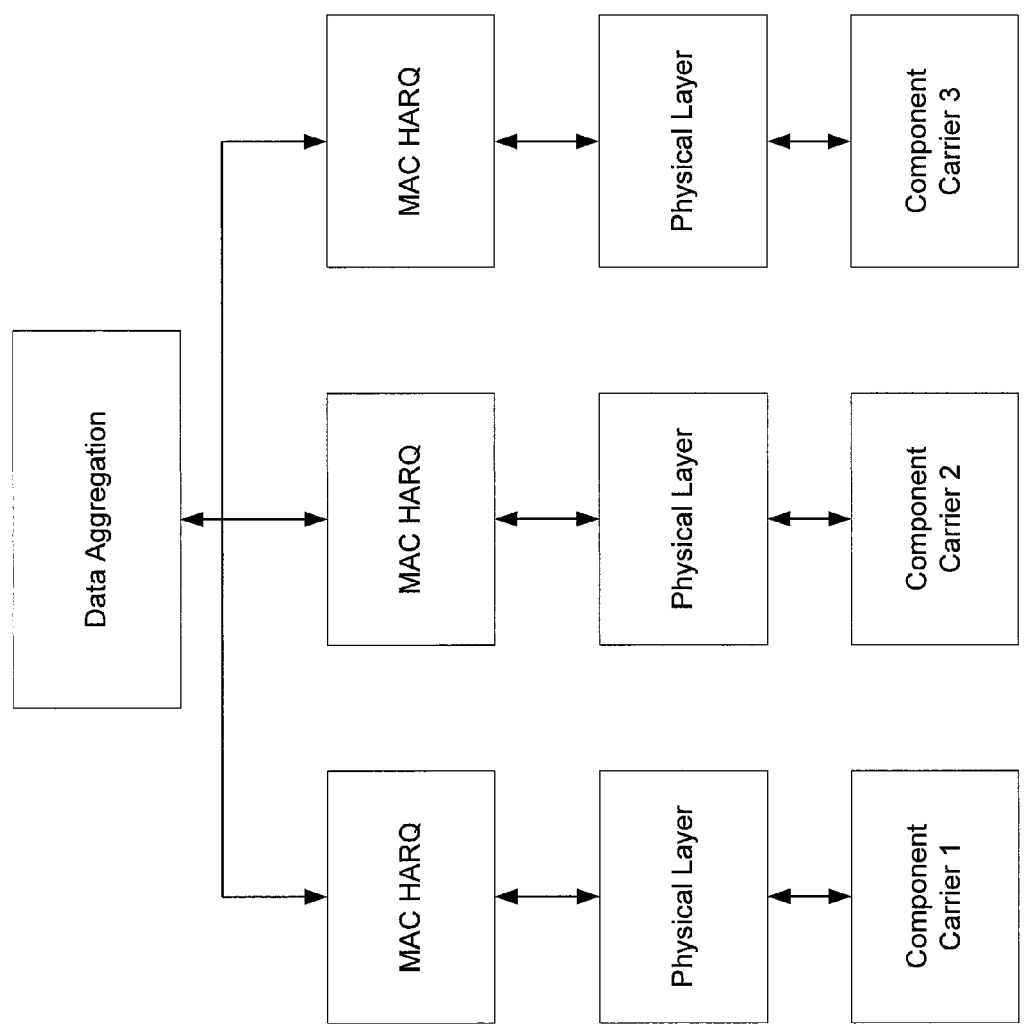
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (e.g., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary component carrier" (PCC). The remaining carriers that depend on the primary carrier for support are referred to as associated secondary component carriers (SCC). For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Figure 6:
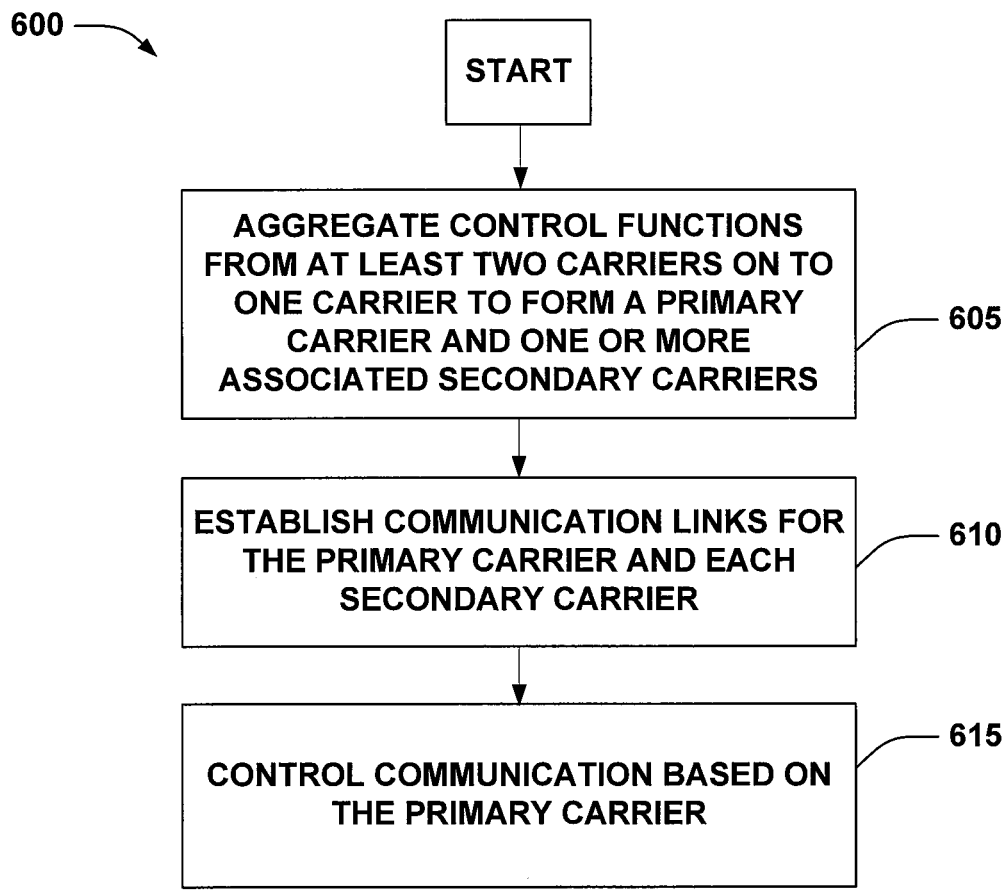
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

Uplink Signal Transmissions in LTE

In LTE, the main uplink physical channels are the physical uplink shared channel (PUSCH) (primarily for data transmission) and the physical uplink control channel (PUCCH) (primarily for control signaling). A UE may transmit measurement reports and/or other control signals on the uplink physical channels.

Measurement reports transmitted by a UE on the uplink may include channel-state indicators (CSI) such as channel-quality indicators (CQI), precoding matrix indicators (PMI), rank indicators (RI), and the like. Other control signals may include hybrid automatic repeat request (HARQ), acknowledgement/negative acknowledgment (ACK/NACK) signals, scheduling requests (SR), and sounding reference signals (SRS).

To acknowledge or negatively acknowledge the reception of one or more transmit blocks on a downlink channel (e.g., DL-SCH), ACK/NACK signals are transmitted on the uplink. To request redundant downlink transmissions used for error correction, HARQ signals are transmitted on the uplink. To request that additional and/or different uplink resources be allocated to the UE, SR signals are transmitted on the uplink. CSI signals are transmitted on the uplink to provide an estimate of channel properties to an eNodeB, as viewed by the UE, to assist with scheduling based on channel conditions. These reports are carried by the PUCCH when no PUSCH resources have been allocated to the transmitting UE. For different types of reports, the PUCCH carries different indicators.

Figure 7:
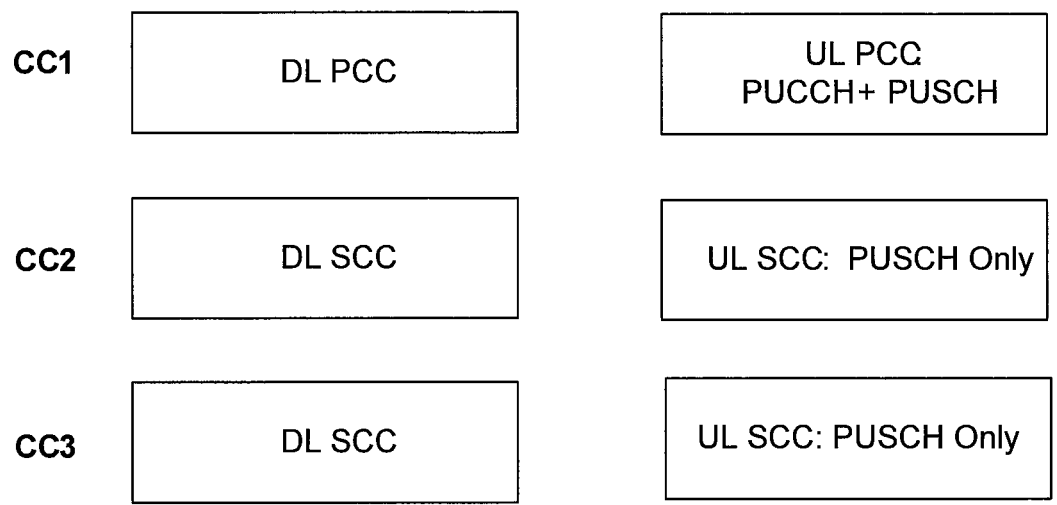
FIG. 7 illustrates the UL PCC carried on the PUCCH and the PUSCH, while the UL SCC is carried on the PUSCH.

In carrier aggregation systems, when signals such as acknowledge and/or negative acknowledge (ACK/NACK), channel quality indicator (CQI), and scheduling request (SR) messages are transmitted on the physical uplink control channel (PUCCH), they are transmitted on the primary component carrier (PCC) rather than a secondary component carrier (SCC). As illustrated at FIG. 7, the UL PCC may carry both the PUCCH and the PUSCH, while the UL SCC may carry the PUSCH only. Also, up to a 5:1 downlink (DL) to uplink (UL) CC mapping is possible. For example, one UL CC may support ACK/NACK transmission on the physical uplink control channel (PUCCH) for up to 5 DL CCs.

According to earlier LTE releases, three formats, formats 1, 2, or 3, were used by the PUCCH when transmitting a type of measuring report. The number of bits used by the PUCCH to transmit the reports depends on which format is used. Scheduling requests and hybrid-ARQ acknowledgments both use PUCCH format 1, which comprises three variants known as formats 1, 1A, and 1B. PUCCH format 1 provides up to two bits per subframe for reporting. Similar to format 1, PUCCH format 2 comprises three variants known as formats 2, 2*a*, and 2*b*. PUCCH format 2 may be used to transmit CSI and other sign, providing up to 11 bits per subframe for reporting CSI and up to 2 bits per subframe for reporting hybrid-ARQ acknowledgments. PUCCH format 3 provides up to 20 bits for transmitting HARQ acknowledgments and up to 1 bit for transmitting scheduling requests. The previous discussion considered the transmission of CSI reports or HARQ reports alone. There are, however, times when multiple reports are transmitted by the UE to the eNodeB in the same subframe. Instead of using multiple PUCCHs to transmit multiple reports, a single PUCCH structure may be used.

Two Types of Uplink Reporting in LTE-A: Periodic and Aperiodic

Figure 8:
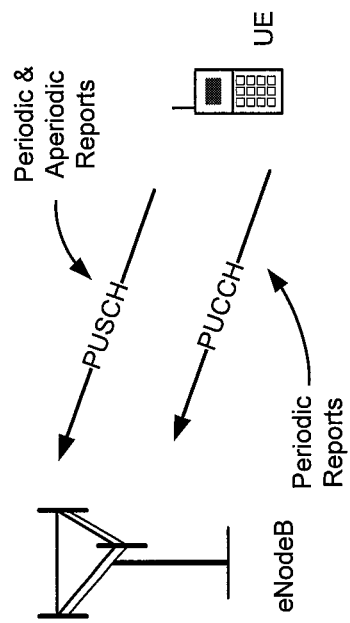
FIG. 8 illustrates both aperiodic and periodic reports being transmitted on the PUSCH, while only periodic reports are transmitted on the PUCCH.

As previously discussed, in LTE-A, a UE may be configured to communicate with one or more base stations using multiple component carriers (CC) (using carrier aggregation). One component carrier is designated as the primary component carrier (PCC) while the other CCs are designated as secondary component carriers (SCC). The primary component carrier may be semi-statically configured, which results in infrequent updates, by higher signaling layers for each UE. Referring to FIG. 8, LTE systems using carrier aggregation support both periodic (time triggered) and aperiodic (event triggered) transmission of the previously discussed measurement signals.

Periodic measurement signaling is performed for only one downlink carrier component in one subframe at a time, and is performed according to a priority. For example, periodic CSI signals are transmitted for downlink carrier components according to which downlink carrier components have the highest priority. Downlink carrier components are prioritized according to their type, where: first priority is given to signaling types 2a, 3, 5, and 6; second priority is given to types 2, 2b, 2c, and 4; and third priority is given to types 1 and 1a. A type 1 report supports CQI feedback for the UE on selected sub-bands. Specifically, a type 1a report supports subband CQI and PMI feedback. Type 2, Type 2b, and Type 2c reports support wideband CQI and PMI feedback, where, for example, a type 2a report supports wideband PMI feedback. A type 3 report supports RI feedback. A type 4 report supports wideband CQI. A type 5 report supports RI and wideband PMI feedback. A type 6 report supports RI and PTI (precoding type indicator) feedback [. The priorities based on signal type are generally applied whether a UE is configured to transmit CSI signals on only the PUCCH or both the PUCCH and the PUSCH. Further, in periodic CSI signaling, a Radio Resource Controller (RRC) may refine a priority between the same types of downlink carrier components and/or further prioritize or re-prioritize the downlink carrier components according to desired system configurations. In any event, for lower-priority downlink carrier components, the CSI signals are often dropped.

Aperiodic measurement signaling may be performed for several downlink carrier components at a given time but requires significantly more overhead than periodic measurement signaling. For example, where a UE is communicating with one or more cells in a carrier aggregation configuration, a CSI request transmitted to the UE may trigger CSI signals for one or more downlink carrier components. The value of the CSI request field can be defined by two bits, where, e.g., a "00" state indicates no CSI signal is triggered, a "01" state indicates a CSI signal is triggered for the uplink carrier component on which the trigger is sent, a "10" state indicates a CSI signal is triggered for a given uplink carrier component according to a higher layer configuration (e.g., provided by an RRC), and a "11" state indicates a CSI signal is triggered for another given uplink carrier component according to a higher layer configuration (e.g., provided by an RRC). Aperiodic CSI signaling is more flexible than periodic CSI signaling because, during aperiodic CSI signaling, a RRC may configure any combination of up to five component carriers allocated to the UE for which signals may be transmitted on the uplink.

In LTE-A, data signals and reference signals are transmitted using one of nine transmission modes. Each channel state information signal is measured based on a particular reference resource (in frequency and time). For example, for transmission Mode 9, the channel measurement is based on the CSI-RS (channel state information-reference signal). For other transmission modes, the channel measurement is based on a common reference signal (CRS). The nine transmission modes used in LTE-A are listed below.

Mode 1: Single Antenna Port, Port 0
Mode 2" Transmit Diversity
Mode 3: Large-Delay CDD
Mode 4: Closed Loop Spatial Multiplexing
Mode 5: MU-MIMO
Mode 6: Closed Loop Spatial Multiplexing, Single Layer
Mode 7: Single Antenna Port, UE-Specific RS (PORT 5)
Mode 8: Single or Dual-Layer Transmission With UE-Specific RS (Ports 7 and/or 8)
Mode 9: Multi-Layer Transmission Mode Excessive Dropping of Periodic CSI Signals According to earlier LTE releases (e.g., release 8), when multiple measurement signals are simultaneously transmitted on the uplink, one or more of those signals may be dropped due to collisions among multiple carrier components. In systems configured to use carrier aggregation, several UEs may each transmit multiple periodic CSI signals on the uplink. Periodic CSI signals transmitted from a UE are typically time-offset from one another to reduce carrier collisions for periodic CSI signals. Nevertheless, carrier component collisions cannot be avoided altogether. Further, in the case of a collision between a periodic CSI signal and an aperiodic CSI signal for the same of different downlink carrier components, the periodic CSI signal is dropped and only the aperiodic CSI signal is transmitted. This occurs even if the periodic and aperiodic CSI signals are for different downlink carrier components. Further, when a UE transmits both ACK/NACK signals and periodic CSI signals but is not configured to transmit on both the PUCCH and the PUSCH, the periodic CSI signal is dropped to avoid collisions between ACK/NACK and periodic CSI transmissions on multiple carrier components. This is true even where the UE is configured to support simultaneous ACK/NACK and periodic CSI transmission by higher level control mechanisms, e.g., where the UE is configured to communication using PUCCH format 3. As a result, periodic CSI signals are frequently dropped causing lengthy signaling periods and undue delay in round-trip communications. Ultimately, such delays may negatively impact downlink communication scheduling and throughput.

Aperiodic CSI signaling may provide some benefit by allowing channel information for multiple carrier components to be transmitted at a given time. However, aperiodic CSI signaling requires more overhead.

Possible Solutions to Excessive Dropping of Periodic CSI Signals

In an attempt to alleviate excessive dropping of CSI signals while still transmitting other measurement signals (e.g., ACK/NACK signals), a periodic PUSCH format may be used. Such a format may be it is also referred to as PUCCH format 4. The terms "periodic PUSCH format" and "PUSCH format 4" may be used interchangeably. Such a format advantageously requires only a small change to previous communication standards, but provides undesirable resource granularity (per RB) and large overhead. According to LTE releases 8, 9, and 10, it is possible that the PUSCH does not carry UL-SCH data, but only carries aperiodic CSI signals using a combination of MCS indices and a number of physical resource blocks (PRBs).

According to this periodic PUSCH format, HARQ-ACK signals may be simultaneously transmitted with CSI signals by allowing HARQ-ACK symbols to puncture up to 4 symbols centered about Demodulation Reference Signal symbols (DM-RSs) within each uplink slot. DM-RSs on uplink physical channels are primarily provided for channel estimation for coherent demodulation and are therefore present in every transmitted uplink slot. The DM-RSs are often positioned near the center of a slot, but the exact number and position of the DM-RSs may be dependent on the type of uplink channel (e.g., type of measurement signal, PUCCH, PUSCH, etc.) being transmitted and the Cyclic Prefix (CP) being used. According to LTE-A, DM-RSs support non-contiguous PUSCH resource allocation.

The periodic PUSCH format is generally sufficient to provide successful uplink transmission of ACK/NACK signals and aperiodic CSI signals under various conditions, but may not be efficient for transmitting ACK/NACK signals and periodic CSI signals. Consider, for example, the case of an aperiodic CSI transmission where using a normal CP, 2 symbols may be used for signaling DM-RSs and up to 12 symbols may be used for information transmission. In extreme situations, 4 symbols may be used for transmitting ACK/NACK and 8 symbols may be used for transmitting aperiodic CSI. As such, in the case of aperiodic CSI signaling, the ratio of payload size between a HARQ ACK/NACK signal and an aperiodic CSI signal is relatively large. For example, in a single carrier context, an ACK/NACK signal may be represented by a maximum of 2 bits for FDD and a maximum of 4 bits for TDD, while an aperiodic CSI signal may be on the order of tens of bits in length (e.g., close to 70 bits). In a carrier aggregation context, an ACK/NACK signal may be represented by a maximum of 10 bits for FDD and a maximum of 20 bits for TDD, while an aperiodic CSI signal may be on the order of hundreds of bits in length (e.g., close to 350 bits).

The relatively large CSI-to-ACK payload ratio sufficiently ensures that ACK signals and aperiodic CSI signals may be simultaneously transmitted with success. As such, even in an extreme situation where 4 symbols are used for transmitting an ACK/NACK signal and 8 symbols are used for transmitting an aperiodic CSI signal, the different requirements for H-ARQ ACK and A-CSI such as payload size difference (roughly a magnitude order of 10) are sufficiently addressed.

Managing ACK/NACK and Periodic CSI Uplink Transmissions

While the periodic PUSCH format provides a greater payload size for CSI reporting, it does not ensure the reliable transmission of ACK/NACK signals. It should be appreciated that, between the cases of periodic CSI signaling and aperiodic CSI signaling, the difference in payload size between HARC ACK/NACK signals and CSI signals greatly varies. As discussed above, the ratio of aperiodic CSI payload size to ACK/NACK payload size is on the order of 10 to 1. However, in the context of periodic CSI signaling, the payload size difference between HARQ ACK and CSI is relatively small. That is, in a single carrier case, an ACK/NACK signal may be represented by a maximum of 2 bits for FDD and a maximum of 4 bits for TDD, while a periodic CSI signal may be represented by a maximum of 11 bits. In a carrier aggregation case, an ACK/NACK signal may be represented by a maximum of 10 bits for FDD and a maximum of 20 bits for TDD, while a periodic CSI signal may be represented by a maximum of 55 bits. In this case, the ratio of periodic CSI payload size to ACK/NACK payload size is on the order of about 3 to 1.

Figure 9:
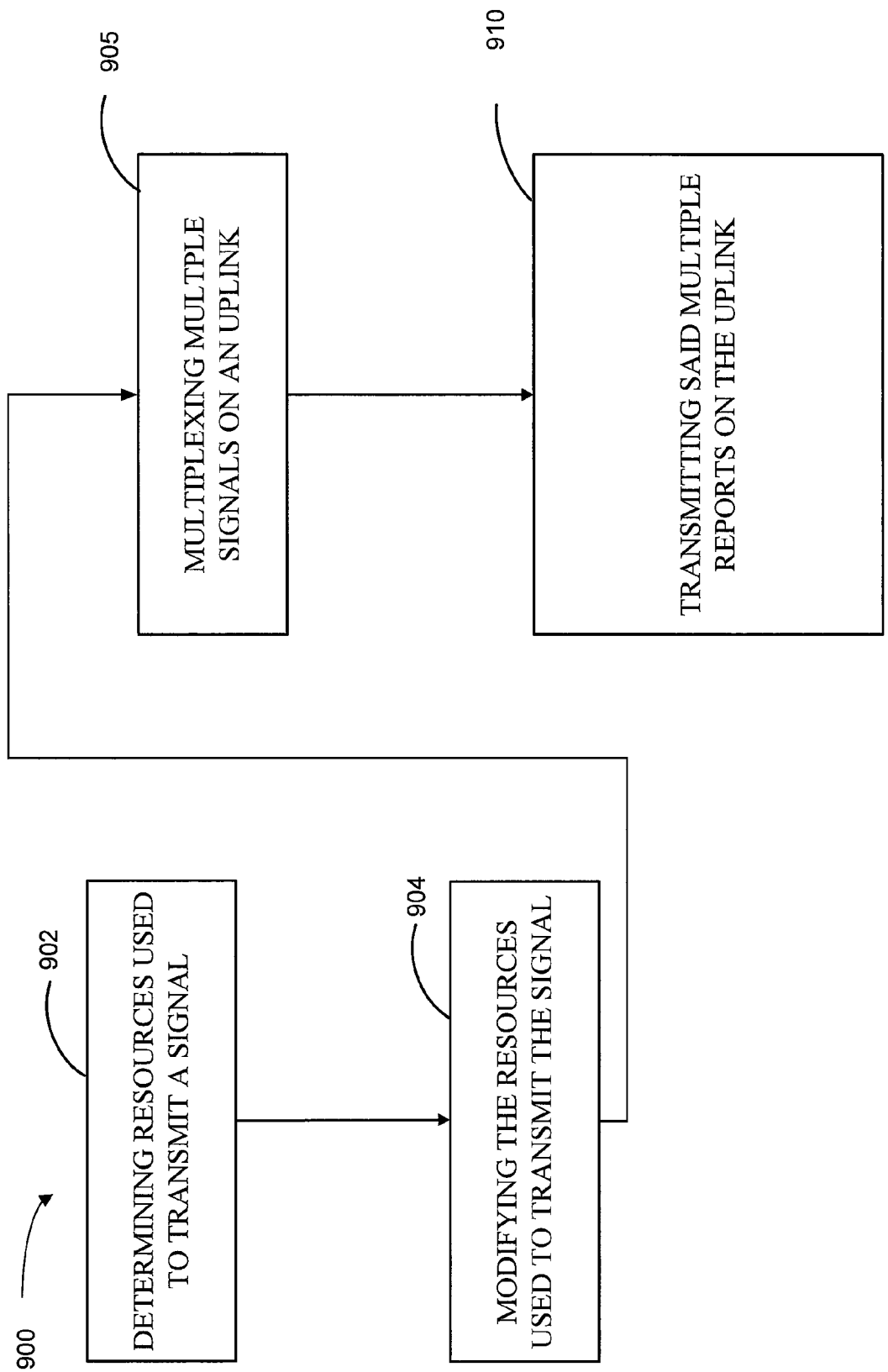
FIG. 9 is a flowchart illustrating a method for transmitting reports on uplink channels.

With the above in mind, aspects are directed to systems and methods for managing the transmission of multiple signals on one or more uplink (UL) channels using carrier aggregation in LTE-A systems. FIG. 9 is a flowchart illustrating a method 900 for transmitting reports on uplink channels. The example operations of FIG. 9 may be performed by a user equipment (UE), such as UE 120 as described above with respect to FIG. 3, for example. At 902, the UE determines resources used to transmit a signal. The resources used to transmit the signal are modified, at 904. At 905, multiple signals are multiplexed on and uplink transmission. The UE will then transmit the multiple reports, at 910, on the uplink. According to one aspect, a UE simultaneously transmits signals such as ACK/NACK and periodic CSI using one or more uplink channels, such as a physical uplink shared channel (PUSCH) and/or a physical uplink control channel (PUCCH), by increasing the resources used to transmit at least one of those signals. According to another aspect, a UE simultaneously transmits ACK/NACK signals and periodic CSI signals by multiplexing those signals on the PUSCH. Certain aspects avoid frequently dropped periodic CSI signals as previously discussed and provide mechanisms to ensure that ACK/NACK signals are transmitted.

The ACK/NACK signals may be multiplexed with the periodic CSI signals on the PUSCH to improve the reliability of ACK/NACK transmissions. Additional features provide further improvement in simultaneously transmitting ACK/NACK signals and periodic CSI signals. Such additional features include: 1) joint coding of ACK/NACK and periodic CSI; 2) allocating additional resources (e.g., symbols, RBs, etc.) to be punctured (or rate matched) by the ACK/NACK according to certain conditions; 3) transmitting ACK/NACK and periodic CSI signals with increased transmit power according to certain conditions, and 4) transmitting ACK/NACK and periodic CSI signals in parallel on the PUSCH and PUCCH where system configurations allow.

Figure 10:
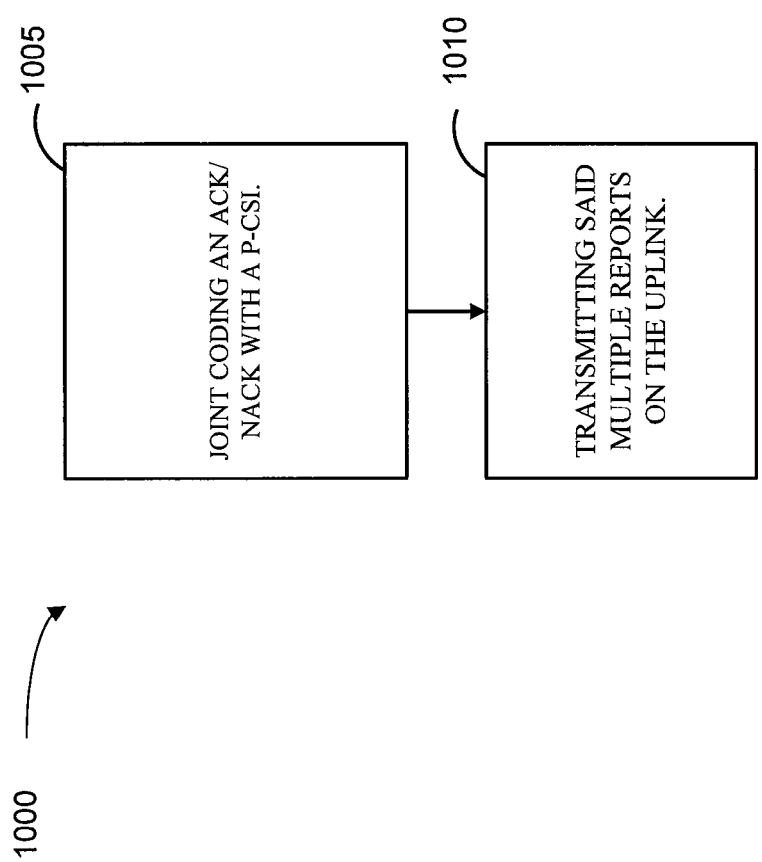
FIG. 10 is a flowchart illustrating a method for transmitting reports on uplink channels.

FIG. 10 is a flowchart illustrating a method 1000 for transmitting reports on uplink channels. The example operations of FIG. 10 may be performed by a user equipment (UE), such as UE 120 as described above with respect to FIG. 3, for example. According to one aspect, a feature enabling simultaneous transmission of ACK/NACK and periodic CSI signals involves jointly coding each on the PUSCH. The ACK/NACK and periodic CSI signals are jointly coded, at 1005, such that more protection is afforded to the ACK/NACK signal and less afforded to the periodic CSI signal. Specifically, the ACK/NACK signal is coded such that it becomes more redundant and the periodic CSI signal is coded such that it becomes less redundant. Such a coding scheme is allowable because, generally, the performance requirements for ACK/NACK signals are much higher than those of periodic CSI signals. At 1010, the multiple reports are then transmitted on the uplink.

Figure 11:
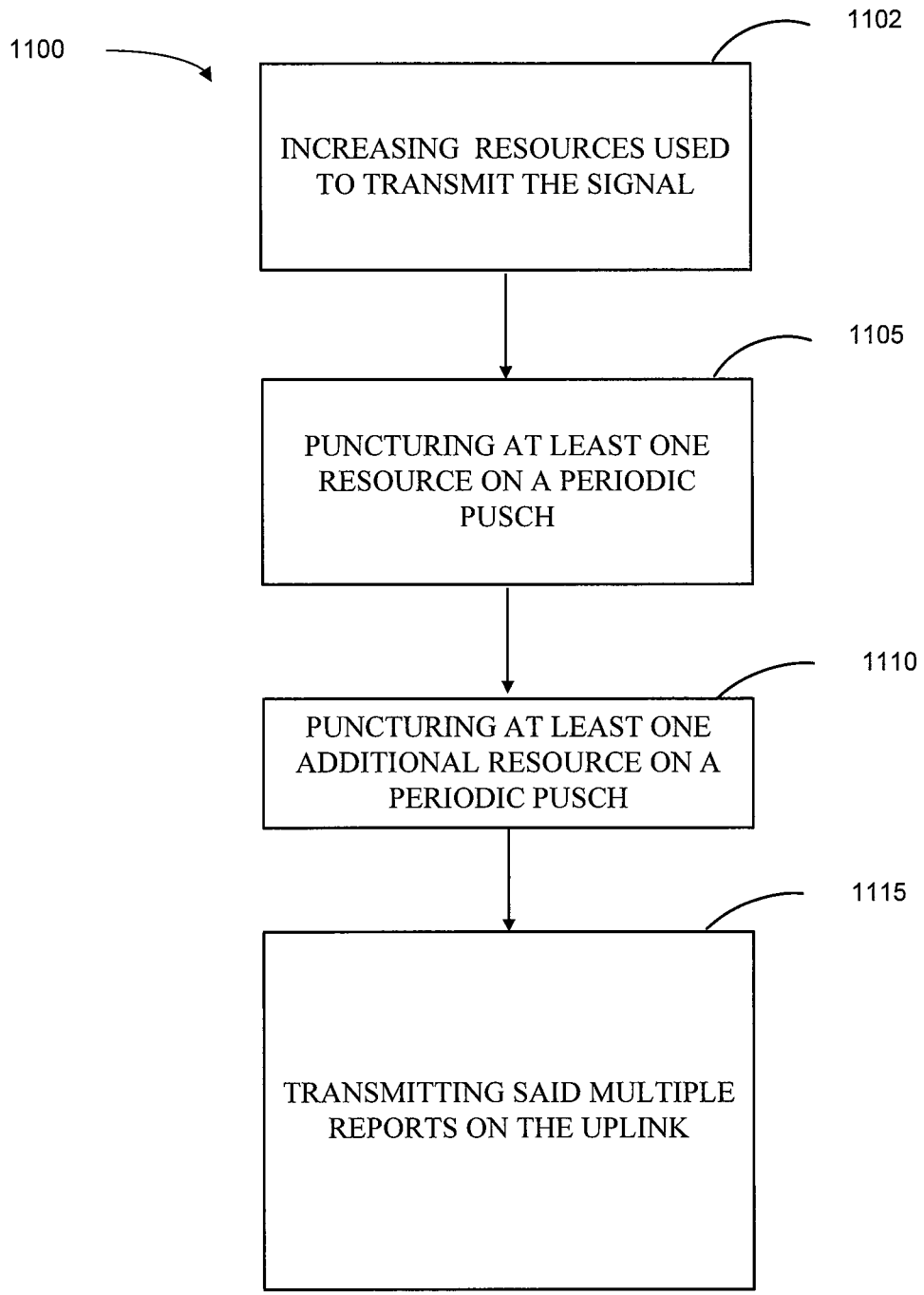
FIG. 11 is a flowchart illustrating a method for transmitting reports on uplink channels.

Another feature that may be implemented to enable simultaneous transmission of ACK/NACK and periodic CSI signals involves allocating additional resources to the ACK/NACK signals. FIG. 11 is a flowchart illustrating a method 1100 for transmitting reports on uplink channels. The example operations of FIG. 11 may be performed by a user equipment (UE), such as UE 120 as described above with respect to FIG. 3, for example. At 1102, the resources used to transmit the signal is increased. At least one resource on a periodic PUSCH is punctured at 1105. As described above, in some implementations, up to 4 symbols in a given uplink slot may be punctured in the periodic PUSCH by ACK/NACK symbols. According to one aspect, more than 4 symbols are punctured by ACK/NACK symbols when certain conditions are satisfied. At 1110, at least one additional resource is punctured on a periodic PUSCH. For example, additional symbols on a periodic PUSCH may be punctured by ACK/NACK symbols when the number of ACK/NACK symbols needed to transmit the ACK/NACK signal with the periodic CSI signal exceeds a threshold. Also, the number of symbols that may be punctured may increase when the ratio between ACK/NACK payload size and periodic CSI payload size exceeds a threshold or a range of desirable values. According to one example, the additional symbols punctured or rate-matched by ACK/NACK symbols may be symbols potentially rate-matched by RI as defined in LTE release 8, 9, and 10. At 1115, the multiple reports are transmitted on the uplink.

Figure 12:
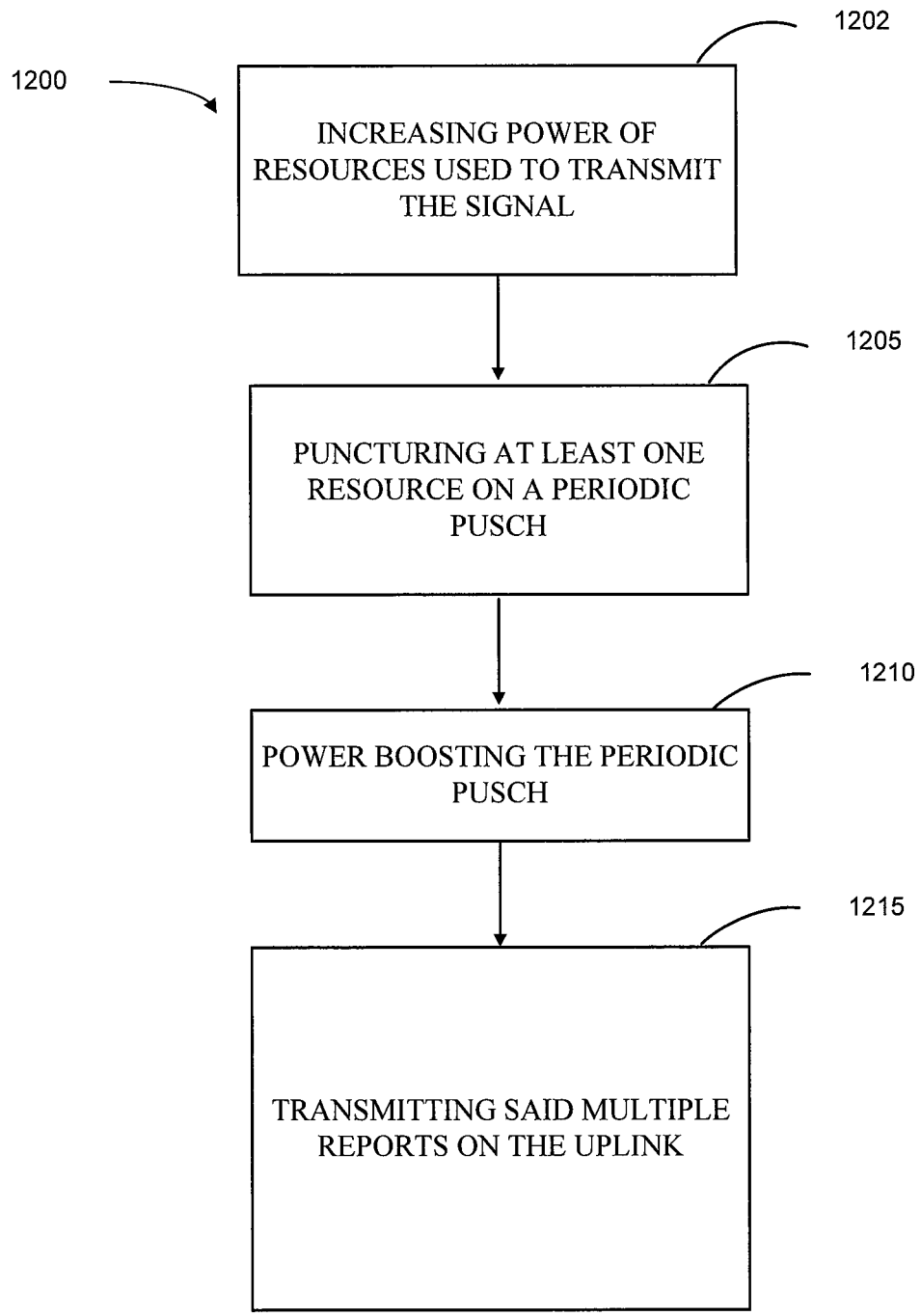
FIG. 12 is a flowchart illustrating a method for transmitting reports on uplink channels.

FIG. 12 is a flowchart illustrating a method 1200 for transmitting reports on uplink channels. The example operations of FIG. 12 may be performed by a user equipment (UE), such as UE 120 as described above with respect to FIG. 3, for example. An additional feature, at 1202, increases power of the resources used to transmit the signals. This feature may be implemented to enable simultaneous transmission of ACK/NACK and periodic CSI signals involves transmitting those signals with increased power. At 1205, at least one resource on a periodic PUSCH is punctured. The power is then increased on the periodic PUSCH, at 1210. That is, the puncturing scheme described above (where 4 symbols are punctured) may be maintained while power is increased on the periodic PUSCH. According to one example, all symbols allocated to the PUSCH are transmitted with increased power. According to another example, only ACK/NACK symbols are transmitted with increased power. According to yet another example, only ACK/NACK symbols and DM-RS symbols are transmitted with increased power. At 1215, the multiple reports are transmitted on the uplink.

According to an aspect, ACK/NACK and periodic CSI signals are transmitted with increased power only when certain conditions are satisfied. For example, a transmission power increase may be applied where the computed REs for the ACK/NACK signal exceeds those offered by the previously-available 4 symbols. In this example, transmit power is increased by an amount proportional to the ratio between the computed REs and the maximum RE limit offered by the previously-available 4 symbols. In another example, transmit power is increased when the number of ACK/NACK symbols needed to transmit the ACK/NACK signal with the periodic CSI signal exceeds a threshold. Further, in another example, transmit power is increased when the ratio between ACK/NACK payload size and periodic CSI payload size exceeds a threshold or a range of desirable values.

Figure 13:
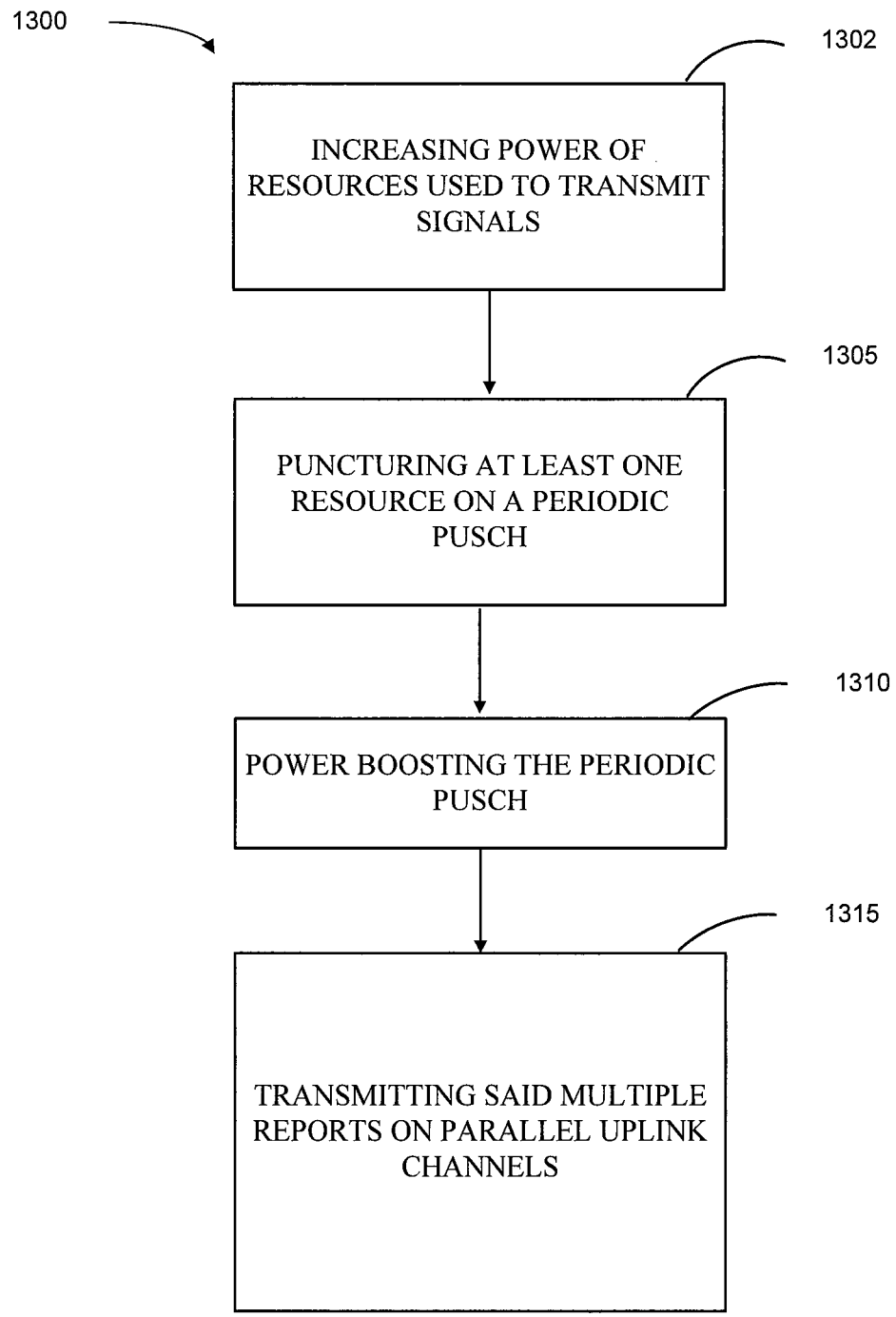
FIG. 13 is a flowchart illustrating a method for transmitting reports on uplink channels.

FIG. 13 is a flowchart illustrating a method 1300 for transmitting reports on uplink channels. The example operations of FIG. 13 may be performed by a user equipment (UE), such as UE 120 as described above with respect to FIG. 3, for example. At 1302, power of the resources used to transmit the signals is increased. This feature may be implemented to enable simultaneous transmission of ACK/NACK and periodic CSI signals involves transmitting those signals with increased power. At 1305, at least one resource on a periodic PUSCH is punctured. The power is then increased on the periodic PUSCH, at 1310. That is, as previously mentioned, the puncturing scheme described above (where 4 symbols are punctured) may be maintained while power is increased on the periodic PUSCH. According to another aspect, where the UE is configured to transmit on both the PUSCH and the PUCCH and the feature of doing so is otherwise available, the UE may transmit the ACK/NACK signal on one channel (e.g., the PUCCH) and may transmit the periodic CSI signal on the other channel (e.g., the PUSCH). In this way, at 1315, the multiple signals are transmitted on separate uplink channels in parallel.

The concepts previously discussed may be readily applied to other situations. For example, when UL data on the PUSCH is scheduled for transmission with only a limited number of RBs (e.g., 1 RB) and the ACK/NACK signal is multiplexed on the PUSCH, the above concepts may be implemented to provide a better performance tradeoff between ACK/NAK and UL data on uplink transmissions. A similar issue may exist when the number of ACK/NACK bits is large while the number of available UL data bits is small. Also, when an aperiodic CSI signal on the PUSCH is scheduled for transmission with only a limited number of RBs (e.g., 1 RB) and the ACK/NACK signal is multiplexed on the PUSCH, the above concepts may be implemented to provide a better performance tradeoff between ACK/NAK and aperiodic CSI on uplink transmissions. A similar issue may exist when the number of ACK/NACK bits is large while the number of aperiodic CQI payload bits is small.

According to one aspect, the power control concepts may depend on the payload size of the periodic CSI on the PUSCH. Also, power control may be different for transmitting different types of signals, as different types of signals may have different performance targets. For example, if the signals consist of signaling types requiring higher performance, transmit power may be increased by a greater amount as compared to cases where the signals consist of signaling types that are subject to less stringent performance requirements. The range of payload sizes can be limited, e.g., in the range of 12-55 bits, with 11 bits corresponding to the maximum periodic CSI payload size of one carrier. This helps enable a feasible power control formula for periodic PUSCH transmissions.

Further, it should be appreciated that the concepts described above can be readily extended to simultaneously transmitting Scheduling Requests (SRs) in addition to the ACK/NACK (if present) and/or periodic CSI signals. In that case, there are different schemes for transmitting the SR, ACK/NACK (if present), and/or periodic CSI on the PUSCH consistent with the concepts described above: 1) dropping the periodic CSI and transmitting the SR and ACK/NACK (if present) according to LTE-A on the PUCCH; 2) transmitting a SR, ACK/NACK (if present), and periodic CSI together on the PUSCH (since the SR and ACK/NACK have similar performance requirements, the SR and ACK/NACK can be jointly coded, and the jointed coded SR and ACK/NACK be treated as if there were only a ACK/NACK transmission); 3) transmitting the SR and ACK/NACK (if present) on the PUCCH while transmitting periodic CSI on the PUSCH (when parallel PUCCH and PUSCH transmission is configured for the UE).

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for managing wireless communications between a base station and a user equipment, the method comprising:
    determining, at the user equipment, resources used to transmit an acknowledgment/nonacknowledgment signal in a channel, wherein the channel carries at least one other signal to the base station;
    identifying, at the user equipment, a reason to modify the resources, wherein the reason is based, at least in part, on a payload size of an uplink control signal exceeding a threshold, the uplink control signal including at least the acknowledgment/nonacknowledgment signal, wherein the payload size includes a number of bits of the acknowledgment/nonacknowledgment signal;
    in response to said identifying, modifying the resources according to the identified reason; and transmitting, from the user equipment, the acknowledgment/nonacknowledgment signal with the modified resources and the at least one other signal in the channel to the base station.

2. The method of claim 1, wherein the payload size of the uplink control signal includes a ratio between a payload size of the acknowledgment/nonacknowledgment signal and a payload size of the at least one other signal, wherein the reason is based, at least in part, on the payload size ratio exceeding a threshold.

3. The method of claim 1, wherein the reason is further based on a higher layer message received from the base station.

4. The method of claim 1, wherein the user equipment is further configured with two or more component carriers, and the at least one other signal comprises a periodic channel state information feedback signal for at least one of the two or more component carriers.

5. The method of claim 1, wherein the at least one other signal comprises a periodic channel state information feedback signal for at least one cell of a same carrier frequency.

6. The method of claim 1, wherein the modifying is performed, at least in part, by increasing a number of the resources used to transmit an acknowledgment/nonacknowledgment signal to the base station.

7. The method according to claim 6, wherein increasing the number of the resources used to transmit an acknowledgment/nonacknowledgment signal to the base station comprises:
puncturing symbols allocated to other signals.

8. The method according to claim 6, wherein the increasing the number of the resources comprises:
puncturing at least one resource on a periodic PUSCH; and
puncturing at least one additional resource on the periodic PUSCH.

9. The method of claim 1, wherein the modifying is performed, at least in part, by increasing a power of the resources used to transmit the acknowledgment/nonacknowledgment signal to the base station.

10. The method according to claim 9, wherein increasing the power of the resources used to transmit an acknowledgment/nonacknowledgment signal to the base station comprises:
increasing transmit power for the resources.

11. The method according to claim 9, wherein the increasing the power of the resources comprises:
puncturing at least one resource on a periodic PUSCH; and
power boosting the periodic PUSCH.

12. The method according to claim 11, wherein the power boosting further comprises:
power boosting all symbols allocated to the PUSCH.

13. The method according to claim 11, wherein the power boosting further comprises:
power boosting the acknowledgment/nonacknowledgment signal allocated to the PUSCH.

14. The method according to claim 11, wherein the power boosting further comprises:
power boosting the periodic PUSCH when a threshold is exceeded.

15. The method according to claim 1, wherein the modifying is performed, at least in part, by joint coding the acknowledgment/nonacknowledgment signal with the at least one other signal.

16. The method of claim 1, wherein the reason is further based on one or more of:
a type of the at least one other signal;
a payload size of the at least one other signal; and
a performance target of the acknowledgment/nonacknowledgment signal and the at least one other signal.

17. An apparatus configured for managing wireless communications between a base station and a user equipment, comprising:
means for determining, at the user equipment, resources used to transmit an acknowledgment/nonacknowledgment signal in a channel, wherein the channel carries at least one other signal to the base station;
means for identifying, at the user equipment, a reason to modify the resources, wherein the reason is based, at least in part, on a payload size of an uplink control signal exceeding a threshold, the uplink control signal including at least the acknowledgment/nonacknowledgment signal, wherein the payload size includes a number of bits of the acknowledgment/nonacknowledgment signal;
means, executable in response to said identifying, for modifying the resources according to the identified reason; and
means for transmitting, from the user equipment, the acknowledgment/nonacknowledgment signal with the modified resources and at least one other signal in the channel to the base station.

18. The apparatus of claim 17, wherein the payload size of the uplink control signal includes a ratio between a payload size of the acknowledgment/nonacknowledgment signal and a payload size of the at least one other signal, wherein the reason is based, at least in part, on the payload size ratio exceeding a threshold.

19. The apparatus of claim 17, wherein the reason is further based on a higher layer message received from the base station.

20. The apparatus of claim 17, wherein the user equipment is further configured with two or more component carriers, and the at least one other signal comprises a periodic channel state information feedback signal for at least one of the two or more component carriers.

21. The apparatus of claim 17, wherein the at least one other signal comprises a periodic channel state information feedback signal for at least one cell of a same carrier frequency.

22. The apparatus of claim 17, wherein the means for modifying is performed, at least in part, by means for increasing a number of the resources used to transmit an acknowledgment/nonacknowledgment signal to the base station.

23. The apparatus according to claim 22, wherein the means for increasing the number of the resources used to transmit an acknowledgment/nonacknowledgment signal to the base station comprises:
means for puncturing symbols allocated to other signals.

24. The apparatus according to claim 22, wherein the means for increasing the number of the resources comprises:
means for puncturing at least one resource on a periodic PUSCH; and
means for puncturing at least one additional resource on the periodic PUSCH.

25. The apparatus of claim 17, wherein the means for modifying is performed, at least in part, by means for increasing a power of the resources used to transmit the acknowledgment/nonacknowledgment signal to the base station.

26. The apparatus according to claim 25, wherein the means for increasing the power of the resources used to transmit an acknowledgment/nonacknowledgment signal to the base station comprises:
means for increasing transmit power for the resources.

27. The apparatus according to claim 25, wherein the means for increasing the power of the resources comprises:
means for puncturing at least one resource on a periodic PUSCH; and
means for power boosting the periodic PUSCH.

28. The apparatus according to claim 27, wherein the means for power boosting further comprises:
means for power boosting all symbols allocated to the PUSCH.

29. The apparatus according to claim 27, wherein the means for power boosting further comprises:
means for power boosting the acknowledgment/nonacknowledgment signal allocated to the PUSCH.

30. The apparatus according to claim 27, wherein the means for power boosting further comprises:
means for power boosting the periodic PUSCH when a threshold is exceeded.

31. The apparatus according to claim 17, wherein the means for modifying is performed, at least in part, by means for joint coding the acknowledgment/nonacknowledgment signal with the at least one other signal.

32. The apparatus of claim 17, wherein the reason is further based on one or more of:
a type of the at least one other signal;
a payload size of the at least one other signal; and
a performance target of the acknowledgment/nonacknowledgment signal and the at least one other signal.

33. A user equipment comprising:
at least one processor; and
a memory coupled to the at least one processor,
wherein the at least one processor is configured to:
determine, at the user equipment, resources used to transmit an acknowledgment/nonacknowledgment signal in a channel, wherein the channel carries at least one other signal to a base station;
identify, at the user equipment, a reason to modify the resources, wherein the reason is based, at least in part, on a payload size of an uplink control signal exceeding a threshold, the uplink control signal including at least the acknowledgment/nonacknowledgment signal, wherein the payload size includes a number of bits of the acknowledgment/nonacknowledgment signal;
in response to said identifying, modify the resources according to the identified reason; and
transmit, from the user equipment, the acknowledgment/nonacknowledgment signal with the modified resources and at least one other signal in the channel to the base station.

34. The user equipment of claim 33, wherein the payload size of the uplink control signal includes a ratio between a payload size of the acknowledgment/nonacknowledgment signal and a payload size of the at least one other signal, wherein the reason is based, at least in part, on the payload size ratio exceeding a threshold.

35. The user equipment of claim 33, wherein the reason is further based on a higher layer message received from the base station.

36. The user equipment of claim 33, wherein the user equipment is further configured with two or more component carriers, and the at least one other signal comprises a periodic channel state information feedback signal for at least one of the two or more component carriers.

37. The user equipment of claim 33, wherein the at least one other signal comprises a periodic channel state information feedback signal for at least one cell of a same carrier frequency.

38. The user equipment of claim 33, wherein the configuration of the at least one processor to modify is performed, at least in part, by configuration to increase a number of the resources used to transmit an acknowledgment/nonacknowledgment signal to the base station.

39. The user equipment according to claim 38, wherein configuration of the at least one processor to increase the number of the resources used to transmit an acknowledgment/nonacknowledgment signal to the base station comprises configuration to:
puncture symbols allocated to other signals.

40. The user equipment according to claim 38, wherein the configuration of the at least one processor to increase the number of the resources comprises configuration to:
puncture at least one resource on a periodic PUSCH; and
puncture at least one additional resource on the periodic PUSCH.

41. The user equipment of claim 33, wherein the configuration of the at least one processor to modify is performed, at least in part, by configuration to increase a power of the resources used to transmit the acknowledgment/nonacknowledgment signal to the base station.

42. The user equipment according to claim 41, wherein configuration of the at least one processor to increase the power of the resources used to transmit an acknowledgment/nonacknowledgment signal to the base station comprises configuration to:
increase transmit power for the resources.

43. The user equipment according to claim 41, wherein the configuration of the at least one processor to increase the power of the resources comprises configuration to:
puncture at least one resource on a periodic PUSCH; and
power boost the periodic PUSCH.

44. The user equipment according to claim 43, wherein the configuration of the at least one processor to power boost further comprises configuration to:
power boost all symbols allocated to the PUSCH.

45. The user equipment according to claim 43, wherein the configuration of the at least one processor to power boost further comprises configuration to:
power boost the acknowledgment/nonacknowledgment signal allocated to the PUSCH.

46. The user equipment according to claim 43, wherein the configuration of the at least one processor to power boost further comprises configuration to:
power boost the periodic PUSCH when a threshold is exceeded.

47. The user equipment according to claim 33, wherein the configuration of the at least one processor to modify is performed, at least in part, by configuration to joint code the acknowledgment/nonacknowledgment signal with the at least one other signal.

48. The user equipment of claim 33, wherein the reason is further based on one or more of:
a type of the at least one other signal;
a payload size of the at least one other signal; and
a performance target of the acknowledgment/nonacknowledgment signal and the at least one other signal.

49. A non-transitory computer-readable storage medium comprising:
code for causing a computer to:
determine, at a user equipment, resources used to transmit an acknowledgment/nonacknowledgment signal in a channel, wherein the channel carries at least one other signal to a base station;
identify, at the user equipment, a reason to modify the resources, wherein the reason is based, at least in part, on a payload size of an uplink control signal exceeding a threshold, the uplink control signal including at least the acknowledgment/nonacknowledgment signal, wherein the payload size includes a number of bits of the acknowledgment/nonacknowledgment signal;

in response to said identifying, modify the resources according to the identified reason; and transmit, from the user equipment, the acknowledgment/nonacknowledgment signal with the modified resources and at least one other signal in the channel to the base station.

50. The non-transitory computer-readable storage medium of claim 49, wherein the payload size of the uplink control signal includes a ratio between a payload size of the acknowledgment/nonacknowledgment signal and a payload size of the at least one other signal, wherein the reason is based, at least in part, on the payload size ratio exceeding a threshold.

51. The non-transitory computer-readable storage medium of claim 49, wherein the reason is further based on a higher layer message received from the base station.

52. The non-transitory computer-readable storage medium of claim 49, wherein the user equipment is further configured with two or more component carriers, and the at least one other signal comprises a periodic channel state information feedback signal for at least one of the two or more component carriers.

53. The non-transitory computer-readable storage medium of claim 49, wherein the at least one other signal comprises a periodic channel state information feedback signal for at least one cell of a same carrier frequency.

54. The non-transitory computer-readable storage medium of claim 49, wherein the code for causing a computer to modify is performed, at least in part, by code for causing a computer to increase a number of the resources used to transmit an acknowledgment/nonacknowledgment signal to the base station.

55. The non-transitory computer-readable storage medium of claim 54, wherein the code for causing a computer to increase the number of the resources used to transmit an acknowledgment/nonacknowledgment signal to the base station comprises code for causing a computer to:
puncture symbols allocated to other signals.

56. The non-transitory computer-readable storage medium of claim 54, wherein the code for causing a computer to increase the number of the resources comprises code for causing a computer to:

puncture at least one resource on a periodic PUSCH; and
puncture at least one additional resource on the periodic PUSCH.

57. The non-transitory computer-readable storage medium of claim 49, wherein the code for causing a computer to modify is performed, at least in part, by code for causing a computer to increase a power of the resources used to transmit the acknowledgment/nonacknowledgment signal to the base station.

58. The non-transitory computer-readable storage medium of claim 57, wherein the code for causing a computer to increase the power of the resources used to transmit an acknowledgment/nonacknowledgment signal to the base station comprises code for causing a computer to:
increase transmit power for the resources.

59. The non-transitory computer-readable storage medium of claim 57, wherein the code for causing a computer to increase the power of the resources comprises code for causing a computer to:

puncture at least one resource on a periodic PUSCH; and
power boost the periodic PUSCH.

60. The non-transitory computer-readable storage medium of claim 59, wherein the code for causing a computer to power boost further comprises code for causing a computer to:
power boost all symbols allocated to the PUSCH.

61. The non-transitory computer-readable storage medium of claim 59, wherein the code for causing a computer to power boost further comprises code for causing a computer to:
power boost the acknowledgment/nonacknowledgment signal allocated to the PUSCH.

62. The non-transitory computer-readable storage medium of claim 59, wherein the code for causing a computer to power boost further comprises code for causing a computer to:
power boost the periodic PUSCH when a threshold is exceeded.

63. The user equipment according to claim 49, wherein the code for causing a computer to modify is performed, at least in part, by code for causing a computer to joint code the acknowledgment/nonacknowledgment signal with the at least one other signal.

64. The non-transitory computer-readable storage medium of claim 49, wherein the reason is further based on one or more of:
a type of the at least one other signal;
a payload size of the at least one other signal; and
a performance target of the acknowledgment/nonacknowledgment signal and the at least one other signal.

\* \* \* \* \*